3,713,867
**METHOD OF COATING GLASS CONTAINERS
AND THE LIKE**
Dean B. Parkinson, Redwood City, and Arthur G. Brown,
Menlo Park, Calif., assignors to Glass Containers Corporation, Fullerton, Calif.
No Drawing. Filed Mar. 24, 1969, Ser. No. 809,999
Int. Cl. C03c 17/32
U.S. Cl. 117—54                                    15 Claims

ABSTRACT OF THE DISCLOSURE

Hot glass is coated, as by spraying, with a monomer, or prepolymer system which contains no volatile solvent or diluent (except one which reacts with the system and does not volatilize) and which under the conditions of application (contact as a film with a hot glass surface) will polymerize to a hard, adherent coating. Ceramic materials may be similarly coated.

---

This invention relates to the coating of glass, more particularly glass containers. The invention is also applicable to ceramic materials.

Various methods and compositions have been employed heretofore to coat glass containers. The purposes of such coating may be to conceal or protect the contents of the glass containers from sunlight, for decorative purposes, to increase the lubricity of the glass containers, etc.

By "lubricity" is meant that property of a glass container which resists abrasion when the glass containers, particularly in wet condition, are rubbed together as they are likely be during handling and processing. It is known that glass containers when rubbed together, especially when wet, tend to adhere to one another and abrade their surfaces. Glass containers having a high degree of lubricity are desirable in that they are not nearly as prone to such abrasion as glass containers having a low lubricity. One system for improving lubricity of glass containers consists of pyrolyzing a zirconium or titanium organic compound on the glass surface at a high temperature, then coating the thus treated surface with an emulsion of an olefin polymer such as polyethylene wax.

In the coating of glass containers for such purposes as enhanced lubricity, decorative effects and to protect or conceal the content, it is desirable that the coating, besides being effective for the specific intended purpose, also be strongly adherent to the glass surface and that the coating be resistant to removal and/or deterioration when subjected to hot water, steam, steam autoclaving, alkalies, acids, organic solvents and detergents such as are commonly used in the sterilization of glass containers or to which the glass containers are likely to be subjected during use.

Coating techniques which employ a volatile solvent or a volatile diluent that must be evaporated from the coating, such as an organic solvent or the water used in an emulsion are disadvantageous because evaporation of the solvent or diluent is troublesome and time consuming and because such evaporation impairs the quality of the coating. Heretofore, to our knowledge satisfactory solventless systems for coating glass containers have not been provided. By "solventless system" it is meant to exclude solvents in the strict sense and also non-reactive diluents such as water in emulsion systems.

Another aspect of glass manufacture which is relevant to the present invention is the coloring of glass. It is customary to color glass by incorporating a pigment in the raw mixture from which the glass is made. In some instances the pigment is added to molten mixture from which glass is made. It has been difficult, by such means, to obtain certain colors, e.g., ruby and yellow. Also, this technique lacks flexibility because, once a colored melt has been prepared it is difficult to change the color in response to fluctuation in production requirements. With an external coloring system, as by applying a colored coating to finished clear glass, greater flexibility and a greater range of colors are possible. However, heretofore, colors applied externally to finished glass have been inferior in appearance and quality.

It is an object of the present invention to provide improvements in the coating of glass, and more particularly, glass containers.

It is a further object of the invention to provide a solventless system for coating glass containers.

It is a particular object of the invention to provide a solventless system for coating glass containers which provides an adherent coating that substantially improves one or more properties of the containers such as lubricity, strength, etc.

Yet another object is to provide an improved method of coloring glass to closely simulate colors, and to improve upon certain colors, which have been imparted to glass heretofore by incorporating pigments in the molten glass before it is converted to the end product.

Yet another object of the invention is to improve the strength of glass and ceramics.

The above and other objects of the invention will be apparent from the ensuing description and the appended claims.

In accordance with the present invention, glass in heated condition, for example during its manufacture and in or near the cool end of a lehr while it is at a temperature of about 300° to 500° F., is coated by spraying it with a polymerizable monomeric system or a low molecular weight polymer in the absence of a solvent or other volatile unreactive diluent. Ceramic articles may be similarly coated.

Usually the application will be done in the presence of a suitable catalyst previously applied to the glass surface or incorporated in the coating material. Also, where needed, a cross-linking, hardening and/or curing agent will be included.

By such means we are able to coat glass containers quickly, for example in the course of producing them as they pass through the lehr. This may be done without interfering with normal production rates and without adding materially to the complications of production of glass containers. Because of the absence of a solvent or other non-reactive, volatile diluent, difficulties and delays due to the evaporation of solvent or other volatile diluents are avoided. The coating is hard and is adherent to the glass, and if a proper selection of materials is made, the coating is resistant to hot water, steam, hot acid, hot alkali, organic solvents and detergents; it substantially enhances lubricity of the glass surface; and it inhibits deterioration of strength of the glass due to exposure of the fresh glass (which has its greatest strength immediately after it is produced) to moisture in the atmosphere. Also, such systems, especially when carried out in accordance with the preferred embodiments of the invention, are compatible with a wide variety of mineral pigments, organic dyes, and ultraviolet absorbers. In the case of pigments and dyes, a wide range of colors and shades is made possible; the colors and shades closely simulate colors and shades imparted to glass by conventional techniques wherein pigment is added to the raw mixture or molten glass; and the advantages of flexibility (e.g., rapid change of colors during production) are obtained. Also, depending upon selection of materials, the viscosity of the coating agent is convenient for spraying (a viscosity of about 40 to 100 cps. being preferred); it has an adequate pot life (e.g., about 24 hours or longer) and it cures quickly (e.g., in a few minutes or less at temperatures or 300° to 500° F.).

In connection with ceramic articles, it is known that like glass, they have their greatest strength when freshly produced and lose strength rapidly on exposure to the atmosphere. By spraying freshly produced ceramic articles with the coating agents of the present invention before they have lost strength and while they are cooling and have reached a temperature range of about 300° to 500° F., their strength is preserved.

Not every prepolymer system (by which is meant the monomer or monomers, low molecular weight polymer or a mixture of both) together with a catalyst, and with a cross-linking or hardening agent if required, is suitable for purposes of the present invention. A system should be selected that has an adequate rate of polymerization, i.e., it should not cure so fast that it is impractical to apply the solventless material to a hot glass surface, nor should it be cured so slowly as to interfere materially with production schedules. Briefly stated, a prepolymer system is selected which cures when sprayed onto a glass surface heated to about 300° to 500° F., and does so within less than about 5 minutes. The curing time of the prepolymer system when sprayed onto a hot glass surface may also be defined as a curing time which is sufficiently short that the applied coating does not sag.

In the preferred embodiment of the invention, a complete prepolymer system is employed. That is to say, a system is employed which includes the monomer and/or low molecular weight polymer, any necessary or desired catalyst or catalysts and any necessary or desired cross-linking, hardening or curing agent or agents together with any desired pigment, dye, ultraviolet absorber or other adjuvant. Alternatively, the glass surface may be first coated with a catalyst as by pyrolysis, then the prepolymer system is sprayed onto the thus-treated hot glass surface. Examples I to VIII below exemplify the preferred (complete) system and Example IX exemplifies the other technique. Another technique consists of spraying the catalyst, hardening agent or curing agent and the prepolymer system separately, but simultaneously onto the hot glass surface. Spraying may be carried out by conventional spray equipment employing a current of air or inert gas to atomize and carry the coating agent; by pressure atomization without a carrier gas and employing a suitable nozzle as is well known in the spraying art; or by electrostatic spraying such as that described in Example X below.

THE PREFERRED EMBODIMENT—GENERAL DESCRIPTION

In the preferred embodiment of the invention, the coating agent consists primarily of a cycloaliphatic polyepoxide having the general formula:

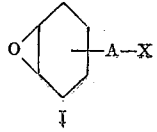

I

In this formula the six-membered ring is a cyclohexane ring (which may be replaced by other cycloaliphatic rings and/or substituted as described below), X is an epoxide-bearing group and A is a linking entity.

The six-membered ring shown in I may, instead, be a 3, 4, 5, 7 or 8 membered ring or even a larger ring; it may have one or more hetero elements in the ring e.g., $>O$, $>S$, or $>NH$; and it may be substituted by hydrocarbyl groups (alkyl such as methyl, ethyl, propyl, butyl, octyl, decyl, etc.; aryl such as phenyl, tolyl, etc.; aralkyl such as benzyl, and cycloaliphatic such as cyclohexyl and cyclopentyl); or by hetero groups such as methoxy, ethoxy, phenoxy, phenylmethoxy, Cl, Br, $NH_2$, substituted amino, OH, SH, etc. This ring may also be unsaturated. Also, condensed rings such as decahydronaphthalene may replace the six-membered ring of I.

In Formula I, A may signify one or more covalent links between X and the epoxidized cycloaliphatic ring shown. This is illustrated in Table A below. Alternatively A may be a linking group ranging in complexity from a simple mono-, di- or tri-atomic group such as $—O—$, $—S—$, $>NH$ or $—CH_2—$ to more complex, e.g., long chain groups, as shown in Table B below.

Table A.—Covalent linking of X to the epoxidized cycloaliphatic ring

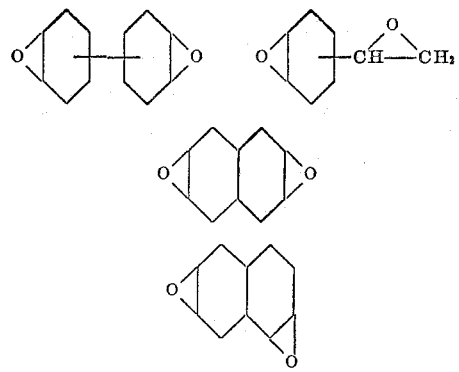

In Table A and throughout this specification, the location of the epoxy oxygen outside a ring is intended to signify both the endo, e.g.,

and the exo, e.g.,

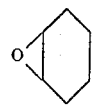

configurations, both of which are operative. When one such stereoisomer is liquid and the other stereoisomer is solid at room temperature, the former (liquid) form is preferred, but in all cases where the cycloaliphatic polyepoxide is solid, and especially where it is rather high melting, its melting point and viscosity can be lowered by applying heat and/or employing a reactive diluent which functions to lower viscosity and melting point but which, in the course of curing on a hot surface, reacts with the cycloaliphatic polyepoxide and therefore does not require evaporation.

TABLE B.—A AS A LINKING GROUP

| | |
|---|---|
| —O— | 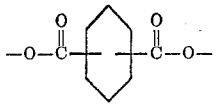 |
| —S— | |
| —NH— | |
| —C— ‖ O | 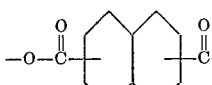 |
| —C—O— ‖ O | |
| —O—C— ‖ O | 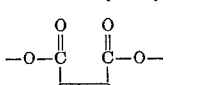 |
| —CH$_2$— | |
| —CHR$_1$— | |
| —CR$_1$R$_2$— | 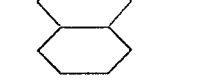 |
| —(CH$_2$)$_m$— (m=1-20) | |
| —(CH$_2$)$_n$—C—O— (n=1-20) ‖ O | |
| —O—C—(CH$_2$)$_n$— (n=1-20) ‖ O | 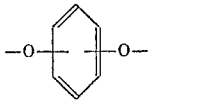 |
| —C—(CH$_2$)$_n$—C— (n=0-20) ‖ ‖ O O | |
| 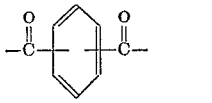 | 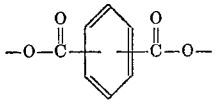 |
| 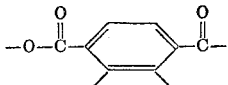 | |
| 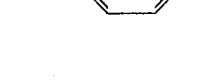 | |
| 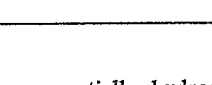 | |

In Table B, $R_1$ and $R_2$ are essentially hydrocarbyl groups, e.g., methyl, ethyl, propyl, etc.; phenyl, etc.; benzyl, etc. $R_3$ and $R_4$ are H, alkyl (e.g., methyl, ethyl, propyl, etc.), aryl, (phenyl, etc.), aralkyl (benzyl, etc.), etc.

In Formula I the second epoxide bearing group X may be identical to the epoxidized cycloaliphatic group shown on the left (i.e., I may be a bis compound) or X may be dissimilar. Formula I-A, represents a bis compound; Formula I-B represents a class of compounds wherein the epoxidized aliphatic group and X are similar but are not identical; and Formula I-C represents a class of compounds in which these two epoxide-bearing groups are quite dissimilar.

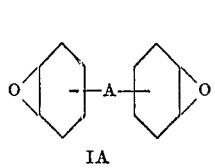 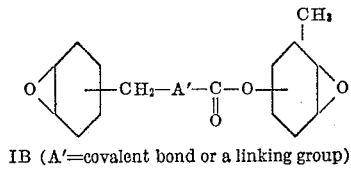

IA     IB (A'=covalent bond or a linking group)

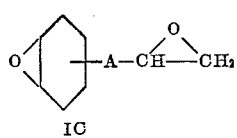

IC

Moreover, A may bear one or more further epoxide-bearing groups such that Formula I takes a form such as

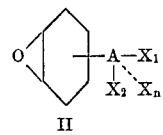

II wherein $X_1$, $X_2$ ... $X_n$ are epoxide-bearing groups, $n$ being zero or a positive integer which indicates the total number of such epoxide-bearing groups. Illustrative of such higher polyepoxides is the following tris-compound:

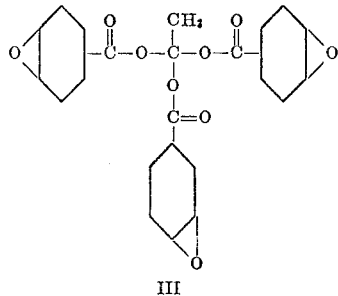

III

It will be understood throughout that rings such as

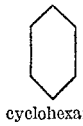     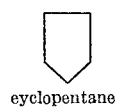

cyclohexane     cyclopentane are fully saturated rings (saturated cycloaliphatic rings); that unsaturation is indicated by a double bond, e.g.,

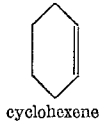

cyclohexene and that an aromatic ring is illustrated by the Kekulé formula e.g.,

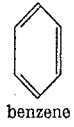

benzene

It will be understood that mixtures of any of these cycloaliphatic polyepoxides may be used as well as mixtures of these and of other cycloaliphatic polyepoxides with non-cycloaliphatic epoxides such as epichlorhydrin, ethylene oxide, propylene oxide and diglycidyl ether or bisphenol A. In any case where a monomeric epoxide is mentioned, its lower homo- and interpolymers may be substituted for the monomer.

Specific examples of suitable cycloaliphatic polyepoxides are:

3,4-epoxycyclohexylmethyl-3,4-epoxycyclohexane-carboxylate;
3,4-epoxy-1-methylcyclohexylmethyl-3,4-epoxy-1-methylcyclohexanecarboxylate;
3,4-epoxy-3-methylcyclohexylmethyl-3,4-epoxy-2-methylcyclohexanecarboxylate;
3-methyl-1,5-pentanediol bis(3,4-epoxycyclohexane-carboxylate;
1,5-pentanediol bis (3,4-epoxycyclohexanecarboxylate);
2-methoxymethyl-2,4-dimethyl-1,5-pentanediol bis(3,4-epoxycyclohexanecarboxylate);
ethyleneglycol bis(3,4-epoxycyclohexanecarboxylate);
2,2-diethyl-1,3-propanediol bis (3,4-epoxycyclohexane-carboxylate);
2-butene-1,4-diol bis (3,4-epoxycyclohexanecarboxylate);
2-butene-1,4-diol bis(3,4-epoxy-6-methylcyclohexane-carboxylate);

1,1,1-trimethylolpropane tris(3,4-epoxycyclohexane-
  carboxylate);
1,2,3-propanetriol tris(3,4-epoxycyclohexanecarboxylate);
dipropyleneglycol bis(2-ethylhexyl-4,5-epoxycyclohexane-
  1,2-dicarboxylate);
diethyleneglycol bis(3,4-epoxy-6-methyl-cyclohexane-
  carboxylate); and
triethylene glycol bis(3,4-epoxycyclohexanecarboxylate);
bis(3,4-epoxybimethylcyclohexylmethyl) adipate;
bis(3,4-epoxycyclohexylmethyl) oxalate;
bis(3,4-epoxy-6-methylcyclohexylmethyl) sebacate;
3,9-bis(3,4-epoxycyclohexyl)spirobi (meta-dioxane);
vinyl cyclohexene dioxide;
bis(2,3-epoxycyclopentyl)ether.

It will be understood that in the general and specific exemplifications above and below wherever a six membered cycloaliphatic ring (such as the cyclohexyl ring) is shown, a 4, 5, 7, 8 or higher membered ring may be used instead, and that the ring may have one or more unsaturated groups; that hetero rings may be used instead of carbocyclic rings wherever a cycloaliphatic or aromatic carbocyclic ring is shown, e.g., furan, pyrrole, pyridine and their fully or partially hydrogenated derivatives; and that wherever a replaceable hydrogen is shown, it may be replaced by a hydrocarbyl (e.g., methyl, ethyl, propyl, decyl, phenyl, tolyl, benzyl, cyclohexyl, etc.) or a hetero (e.g., methoxy, ethoxy, amino, dimethyl amino, etc.) groups.

The cycloaliphatic polyepoxides of the classes described and illustrated above may be catalyzed by any of a variety of catalysts including polyvalent metal modified phenolaldehyde resins, polyvalent metal salts of phenols, polyvalent metal salts of polysiloxanols, and various Lewis acids. Examples of these classes of catalysts are set forth below:

Polyvalent metal salts of phenolic novolac resins having the general formula

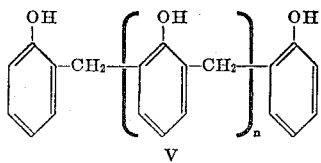

V where $n$ is a small integer, e.g., 1, 2, or 3. This resin is referred to hereinafter as "Resin V." The metals forming salts of Resin V and other similar resins may be, for example, Al, Fe III and Ti IV. Homologues may be employed in which the benzene rings are substituted by one or more $C_1$ to $C_5$ alkyl groups.

Salts of the same metals with polyhydric phenols such as 2,4,4'-trihydroxybenzophenone; 2-nitroso-1-naphthol; 1,2,4-trihydroxy-anthraquinone; etc.

Salts of the same metals with polysiloxanols which are hydrolytic products of $R_nSiX_{4-n}$ where R is phenyl or methyl, X is halogen (Cl, Br, F) and $n$ is 1 to 1.7; such polysiloxanols being soluble in xylene and having 0.45 to 20% by weight of hydroxyl radicals.

Lewis acids such as stannous octoate and triphenyl tin chloride.

In those cases where the aliphatic polyepoxide is slow curing, or where for any reason faster cure is desired, appropriate catalysts may be employed such as tertiary amines, e.g., benzyldimethylamine and dimethylethanolamine. Generally, however, it is preferred to use a fast curing aliphatic polyepoxide with a catalyst of the types described above.

Where desired (i.e., where the coating after application to hot glass is not sufficiently hard for the intended purpose) a hardening or cross-linking agent may, and usually will, be added. Suitable examples are set forth below:

Polyhydric phenols, e.g., low molecular weight phenolic-novolac resins, bisphenol A and modified phenol-aldehyde resins such as 2,6-dimethylol-4-hydrocarbylphenol and their condensation products, Polysiloxanols such as those mentioned above but in the hydroxyl rather than the salt form.

Polycarboxylic anhydrides such as phthalic anhydride, succinic anhydride, maleic anhydride, hexahydrophthalic anhydride, methyl bicyclo-[2,2,1]-heptene-2,3-dicarboxylic anhydride.

THE PREFERRED EMBODIMENT—SPECIFIC EXAMPLES

Test procedures

Cure time of the coating was measured by spectrophotometry and solvent resistant tests for insolubility. Lubricity was measured by the technique of Hazdra et al., Package Engineering, 94, 97–111 (1964).

Labeling tests were performed to ascertain the compatibility of the coating with various adhesives commonly used to adhere labels to glass containers. The procedure of Hazdra et al., op. cit., was employed.

Printability of the coating was tested by marking with standard price marking inks, and observing whether the coatings marked well and whether the markings smudged.

Durability of the coatings was tested against 5% sodium hydroxide solution, hot water, steam and 50% ethanol by the procedure of Hazdra et al., op. cit.

Flexural strength tests were made, not on the glass containers, but on freshly drawn soft glass rods to simulate freshly produced glass, because flexural strength is known to diminish on aging of freshly manufactured glass and exposure to moisture. The flexural strength tests were those of ASTM C 158-43 (1965).

Example I.—A mixture of 80 parts by weight of a cycloaliphatic diepoxide, 15 parts by weight of a reactive, nonvolatile diluent, 5 parts by weight of a phenol-formaldehyde resin (as a curing agent and hardener) and one part by weight of stannous octoate (as a catalyst) was prepared (in this example and in all others where a preparation is referred to as a "mixture" it will be understood that this includes solutions as well as dispersions. In all examples and tables, parts are by weight). The diepoxide was 3,4-epoxycyclohexylmethyl-3,4-epoxycyclohexane carboxylate having the following structure.

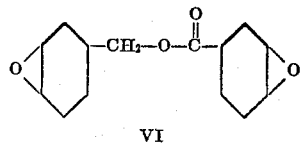

VI

This epoxide will be referred to hereinafter as Epoxide VI. The reactive diluent was decylglycidyl ether. The phenol-formaldehyde resin was a commercially available novolac type resin having the structure of Resin V, supra. The reactive diluent, decyl glycidyl ether, was included to provide a convenient viscosity for spray application; it reacted with the other reactants and was not volatilized.

This mixture had a viscosity of 80 cps. and a useful pot life of seven days at room temperature. It is compatible with a large number of organic and inorganic dyes and pigments (for example, carbon black, titanium dioxide, zinc oxide, azo dyes, aniline black, phthalocyanine blue, phthalocyanine green, anthraquinone red, anthraquinone yellow, nigrosines, barium lithol reds, pigment green B, pigment green 10, and benzidine yellow); with mineral fillers (for example, calcium carbonate, silica, clays, mica, metal powders); and with ultraviolet absorbers or screening agents (e.g., 2(2'-hydroxy-3'-ditert.-butyl-5'-methyl-phenyl) benzotriazole;
2(2'-hydroxy-3',5'-ditert.-butyl phenyl) benzotriazole;
2(2'-hydroxy-5-methylphenyl) benzotriazole;
p-octylphenylsalicylate;
2-ethyl-hexyl-2-cyano-3,3-diphenyl acrylate;
ethyl-2-cyano-3,3-diphenyl acrylate;
2,4-dihydroxybenzophenone;
2,2'-dihydroxy-4,4'-dimethoxy benzophenone;

2,2',4,4'-tetrahydro benzophenone;
2-hydroxy-4-methoxy benzophenone;
2,2'-dihydroxy-4,4'-dimethoxy-5-sulfobenzophenone;
resorcinol monobenzoate;
nickel bisoctyl phenylsulfide;
[2,2'-thiobis(4-tert-octyl phenolate)]-n-butylamine nickel).

One percent of 2-ethylhexyl-2-cyano-3,3-diphenyl acrylate incorporated in this mixture cut off the major part of ultraviolet radiation below about 3600 angstrom units so that one mil coatings on glass containers gave less than ten percent transmission of light below 3600 angstrom units with less than one percent light transmission occurring below 3500 angstrom units.

This mixture was applied as follows: Conventional, used glass containers were washed thoroughly with detergent in water, rinsed thoroughly with tap water, then with distilled water, and dried at room temperature. Then the containers were heated to and held at 500° F. for two hours. During application of the mixture, the containers were held at 400° F. and each container was rotated at about 120 r.p.m. The mixture was sprayed onto the exterior of the rotating containers from a commercial spray gun.

The mixture of Example I produced a clear, hard coating with a cure time of less than one minute at 400° F.

Example II.—Other coating mixtures having Epoxide VI as the principal ingredient are as follows (all parts by weight):

Mixture No. 2

| | |
|---|---|
| Epoxide VI | 90 |
| Bisphenol A | 63 |
| Vinyl cyclohexene dioxide | 17 |
| Stannous octoate | 2 |

Mixture No. 3

| | |
|---|---|
| Epoxide VI | 90 |
| Bisphenol A | 63 |
| Octylene oxide | 17 |
| Stannous octoate | 2 |

Mixture No. 4

| | |
|---|---|
| Epoxide VI | 90 |
| Vinyl cyclohexene oxide | 10 |
| Stannous octoate | 2 |

Mixture No. 5

| | |
|---|---|
| Epoxide VI | 90 |
| Octylene oxide | 10 |
| Stannous octoate | 2 |

Mixture No. 6

| | |
|---|---|
| Epoxide VI | 90 |
| Bisphenol A | 20 |
| Epoxidized soybean oil | 40 |
| Stannous octoate | 2 |

These mixtures all provided clear, hard coatings having good adhesion to glass. All cured at 500° F. within 5 minutes when sprayed onto hot (500° F.) glass. Mixtures 2, 3 and 6 were rather viscous because of the presence of bisphenol A. The vinyl cyclohexenes dioxide,

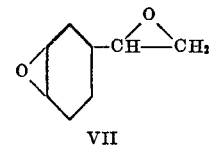

VII and the octylene oxide

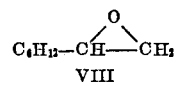

VIII where added as reactive diluents.

Example III.—This exemplifier mixtures containing the same epoxide (Epoxide VI) as the major ingredient but which cured in a much shorter period of time than the mixtures of Examples I and II at 400° F.

Formulations and results are set forth in Table I below.

TABLE I

| Mixture No. | Formulation | Proportions (parts by weight) | Cure time | Remarks |
|---|---|---|---|---|
| 7 | Epoxide VI<br>Phenol-formaldehyde Resin V<br>Stannous octoate | 100<br>10<br>1 | Less than 1 min., 500° F. | Clear, hard coating with good adhesion; viscosity at 25°, 1,320 cp. |
| 8 | Epoxide VI<br>Resin V<br>Stannous octoate<br>Methylene chloride | 100<br>10<br>1<br>11 | ....do............ | Clear, hard coating with good adhesion; viscosity at 25° C., 600 cp. |
| 9 | Epoxide VI<br>Resin V<br>Stannous octoate<br>Methylene chloride | 100<br>10<br>1<br>22 | ....do............ | Clear, hard coating with good adhesion; viscosity at 25° C., 60 cp. |
| 10 | Epoxide VI<br>Resin V<br>Vinylcyclohexene dioxide (Compound VII).<br>Stannous octoate | 80<br>5<br>25<br>1 | Less than 1 min., 400° F. | Clear, hard coating; good adhesion. |
| 11 | Epoxide VI<br>Resin V<br>Compound VII<br>Stannous octoate<br>2-ethylhexyl-2-cyano-3,3-diphenyl acrylate (Compound IX). | 80<br>5<br>25<br>1<br>1 | ....do............ | Do. |
| 12 | Epoxide VI<br>Compound VII<br>Stannous octoate<br>Compound IX | 80<br>20<br>1<br>1 | Partial cure at 400° F. | Do. |
| 13 | Epoxide VI<br>Resin V<br>Butyl glycidyl ether (Compound X)<br>Compound IX<br>Stannous octoate | 80<br>5<br>15<br>1<br>1 | Less than 1 min., 400° F. | Do. |
| 14 | Epoxide VI<br>Resin XI<br>Compound VII<br>Compound IX<br>Stannous octoate | 80<br>5<br>25<br>1<br>1 | ....do............ | Do. |
| 15 | Epoxide VI<br>Resin XI<br>Compound X<br>Compound IX<br>Stannous octoate | 80<br>5<br>15<br>1<br>1 | ....do............ | Do. |

TABLE I—Continued

| Mixture No. | Formulation | Proportions (parts by weight) | Cure time | Remarks |
|---|---|---|---|---|
| 16 | Epoxide VI | 80 | Less than 1 min., 400° F. | Clear, hard coating; good adhesion. |
| | Resin V | 5 | | |
| | Decylglycidyl ether (Compound XII) | 15 | | |
| | Compound IX | 1 | | |
| | Stannous octoate | 1 | | |
| 17 | Epoxide VI | 80 | ....do............ | Do. |
| | Resin XI | 5 | | |
| | Compound XII | 15 | | |
| | Compound IX | 1 | | |
| | Stannous octoate | 1 | | |
| 18 | Epoxide VI | 80 | ....do............ | Clear, hard coating; dark brown in color. |
| | Resin XI | 5 | | |
| | Compound XII | 15 | | |
| | Compound mixture XIII | 1 | | |
| | Vanadium acetyl acetonate | 0.5 | | |
| | Stannous octoate | 0.5 | | |
| 19 | Epoxide VI | 80 | ....do............ | Clear, hard coating; yellow in color. |
| | Resin V | 5 | | |
| | Compound XII | 15 | | |
| | Compound mixture XIII | 1 | | |
| | Vanadium acetyl acetonate | 0.5 | | |
| | Stannous octoate | 0.5 | | |
| 20 | Epoxide VI | 80 | Less than 3 min., 400° F. | Clear, hard coating; orange in color. |
| | Resin V | 5 | | |
| | Compound VII | 25 | | |
| | Compound mixture XIII | 1 | | |

In Table I above, Resin XI (see Mixture No. 14) is a low molecular weight condensation product of 2,6-dimethylol-4-hydrocarbylphenol having the formula

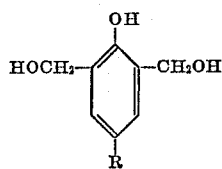

wherein R is an alkyl, aryl and/or aralkyl group. The product used was a product of Reichold Chemical Co. known as Super Beckacite 1001. Resin Mixture XIII (See Mixture No. 18) was a mixture of 2,2'-dihydroxy-4,4'-dimethoxybezophenone and other similar tetrasubstituted benzophenones.

Each of Mixtures Nos. 7 to 20 gave a clear, hard coating on glass containers when applied as in Example I, and the coating had good adhesion to the glass as determined by the tests of Example I. All except No. 20 cured in less than one minute at 500° F., and several at 400° F. No. 20 cured in less than 3 minutes at 400° F. Those mixtures containing a pigment (Nos. 18 and 19), or ultraviolet absorber (such as No. 20) produced colored (but clear) coatings having a good appearance, i.e., dark brown, in the case of No. 18; yellow with No. 19 and orange with No. 20. These colors closely simulated colors produced by incorporating pigments in the glass.

Mixture No. 10 was subjected to formulation with commercially available colorants, the results being as shown in Table II.

TABLE II

| Colorants | Solubility | Remarks |
|---|---|---|
| Auric Brown | Insoluble | Discarded. |
| Bon Red Dark | do | Strong bluish red. |
| Solvent Orange | Soluble | Strong orange. |
| Perox Blue 2R | do | Strong blue. |
| Perox Yellow No. | do | Strong yellow. |
| Perox Red No. 46 | do | Strong red. |
| Polymon Violet RS | Insoluble | Strong violet. |
| Monolite Fast Yellow FRS | do | Weak, nonuniform yellow. |
| Polymon Blue 3RS | do | Very weak blue. |
| Monolite Fast Red XS PRD | do | Weak red. |
| Polymon Yellow RS | do | Strong yellow. |
| Polymon Green GGS | do | Strong emerald green. |
| Polymon Blue LBS | do | Dark blue with visible solid pigment particles. |
| Ramapo Green | do | Strong emerald green. |
| Monastral Blue BF | do | Strong dark blue. |
| Monastral Violet R | do | Dark magenta. |
| Watchung Red B | do | Dark red. |
| Newport Maroon | do | Dark red with visible solid pigment particles. |
| Indanthrone Blue | do | Dark blue with visible solid pigment particles. |
| Pigment Green B | Soluble | Dark blue-green. |
| Nigrosine Black | Insoluble | Weak black with visible solid pigment particles. |
| Carbon black | do | Opaque black. |

Some of these colorants produced films of good transparency whereas others produced films of poor transparency. Carbon black produced an opaque film.

Glass containers coated with Mixture No. 10 were subjected to labeling tests with the results as shown in Table III.

TABLE III

| Adhesive | 20% RH, 25° C., 14 days | | 2-4% RH, 25° C., 14 days | | 92-93% RH, 25° C., 14 days | | 1% RH, 60° C., 14 days | | 2-5° C., 14 days | |
|---|---|---|---|---|---|---|---|---|---|---|
| | Uncoated | Coated | Uncoated | Coated | Uncoated | Coated | Uncoated | Coated | Uncoated | Coated |
| Dextrin-starch-urea | No failures. | No failures. | No failures. | No failures. | No failures. | No failures. | No failures. | No failures. | No failures. | No failures. |
| Gum jelly | do | Failed | do | Failed | do | Failed | do | Failed | do | Failed. |
| Hot melt | do | No failures. | do | No failures. | do | No failures. | do | No failures. | do | No failures. |
| Vinylacetate emulsion glue | do | do | do | do | Failed | Failed | do | do | do | Do. |
| Rubber cement | do | do | do | do | No failures. | No failures. | do | do | do | Do. |
| Pressure sensitive adhesive: | | | | | | | | | | |
| No. 1 | do | do | do | do | do | do | do | do | do | Do. |
| No. 2 | do | do | do | do | do | do | do | do | do | Do. |

Referring to Table III, label tests were carried out under a wide range of conditions including very high humidity, very low humidity, room temperature and low temperature. Very few failures resulted.

Mixture No. 7 was mixed with ultraviolet inhibitors, with results as shown in Table IV. The UV inhibitor was incorporated in Mixture No. 7 in the amounts specified in Table IV. A coating having a thickness of 0.1 mil was applied and was cured identically in each case. The glass containers coated were of identical manufacture.

All of the coatings of mixtures of Examples I to III could be marked readily with standard price marking inks.

methylphenyl polysiloxanol resulting from hydrolysis of $(CH_3)_a(C_6H_5)_bSiX_c$ in which X is a halogen, $c=1$ or 2 and $a+b=2$ or 3 and $a+b+c=4$.) The flow-out was excellent with all parts of the bottle being well coated. A formulation identical to that given above but containing no Dow–Corning Z–6018 gave a final coating that showed breaks with spots where the glass was nearly void of material.

Example VII.—Twenty grams of a mixture of 16 grams Epoxide VI with four grams vinylcyclohexene dioxide were mixed with 0.3 gram of the reaction product of a ten to one weight ratio of the same polysiloxanol as in Example VI with tetrabutyl titanate as a catalyst. A one

TABLE IV

| UV absorber (percent in general formulation) | Wavelength below which— | | Visual color |
|---|---|---|---|
| | 10% light transmission occurs | 1% light transmission occurs | |
| Uncoated glass control | 3,210 | 3,160 | Colorless. |
| Coated glass control, no absorber | 3,310 | 3,200 | Faint yellow tinge. |
| 0.1% ferric acetyl acetonate | 3,460 | 3,150 | Brown. |
| 0.5% vanadium acetyl acetonate (VAA) | 3,580 | 3,330 | Light amber. |
| 0.5% VAA plus 1% mixture of 2,2'dihydroxy-4,4'-dimethoxy-benzophenone and other tetra-substituted benzophenones. | 4,450 | 4,100 | Do. |
| 1% mixture of 2,2'-dihydroxy-4,4'-dimethoxy-benzophenone and other tetra-substituted benzophenones. | 4,070 | 4,000 | Yellow. |
| 1% 2-hydroxy-4-methoxy-5-sulfobenzophenone | 3,760 | 3,640 | Light yellow. |
| 1% 2,4-dihydroxy-benzophenone | 3,900 | 3,780 | Do. |
| 1% 2,2'-dihydroxy-4,4'-dimethoxy-benzophenone | 4,080 | 4,000 | Yellow. |
| 1% ethyl-2-cyano-3,3-diphenyl acrylate | 3,550 | 3,440 | Very light yellow. |
| 1% 2-ethyl-hexyl-2-cyano-3,3-diphenyl acrylate | 3,950 | 3,500 | Do. |
| 1% 2,2',4,4'-tetrahydroxy benzophenone | 4,290 | 4,075 | Yellow. |
| 1% 2(2'-hydroxy-3'-ditert.-butyl-5'-methyl-phenyl) benzotriazole | 4,050 | 3,980 | Very light brown. |
| 1% 2(2'-hydroxy-3',5'-ditert.-butylphenyl) benzotriazole | 3,950 | 3,875 | Do. |
| 1% 2-hydroxy-4-methoxy-benzophenone | 3,750 | 3,610 | Very light yellow. |
| 1% 2,2'-dihydroxy-4-methoxy-benzophenone | 3,980 | 3,850 | Do. |
| 1% 2-hydroxy-4-methoxy-2'-carboxybenzophenone | 3,540 | 3,440 | Do. |

Example IV.—In this example a polyvalent metal-modified phenol-aldehyde resin was used as a hardener and activator or catalyst for a coating mixture predominating in Epoxide VI. Ten grams of phenol-formaldehyde resin (novolac type, $n=1-3$) were mixed with one gram of ferric chloride dissolved in 20 ml. of methyl alcohol. After solution of the resin in the alcohol, the alcohol was evaporated on a steam bath to leave a brown paste. Then, 10 grams of Epoxide VI were mixed with one gram of this paste. A film produced from this mixture after heating less than one minute at 200° C. (392° F.) provided a transparent brown, tough coating for glass having high resistance to chemicals.

Example V.—A number of uncoated bottles and freshly drawn glass rod specimens were coated by spraying a mixture of 90% Epoxide VI, 9% phenol-formaldehyde resin (same as in Example I) and 1% stannous octoate. The temperature of the surfaces was about 450° F. After two minutes at this temperature, a hard solid transparent coating was formed. Rubbing two of the bottles hard against each other by hand resulted in no scratches developed on either bottle, whereas uncoated bottles developed scratches. Coated glass rod specimens maintained 100% flexural strength retention after one week exposure to the atmosphere, whereas uncoated glass rod specimens suffered a reduction to about 25% of the original flexural strength measured on freshly drawn glass rod.

Example VI.—In this example the flow out property was improved by incorporating a hydroxy functional, low molecular weight silicone. Formulation and results were as follows:

A mixture of eighty grams Epoxide VI with fifteen grams decylglycidyl ether, five grams of Resin V, one gram stannous octoate and two grams Dow-Corning Z–6018 was sprayed and cured on a glass bottle at 400° F. (Dow-Corning Z–6018 is a low molecular weight mil coating of this mixture on glass hardened to a hard glossy solid after one minute at 250° F.

Example VIII.—Ten grams of a mixture of vinylcyclohexene dioxide (used instead of Epoxide VI) were mixed with 0.2 gram of the aluminum salt of 2,4,6-trihydroxybenzoic acid. A one mil coating of this mixture on glass gave, after heating for five minutes at 300° F., a transparent hard glossy coating.

Other hydroxy functional organic compounds that can be combined wtih polyvalent metals for this purpose include 2,4,4'-trihydroxybenzophenone; 2-nitroso-1-naphthol; 1,2,4-trihydroxyanthraquinone; 2,2',4,4'-tetrahydroxybenzophenone; 2,4-dihydroxybenzophenone; and 2,2'-dihydroxybenzotriazole.

Example IX.—In this example the catalyst was applied to a glass surface by pyrolysis before spraying with the prepolymer. Procedure and results were as follows:

A saturated ferric acetyl acetonate solution in anhydrous n-butanol was sprayed on glass bottles heated to a temperature of about 1100° F. The ferric acetylacetonate was pyrolyzed almost immediately. A clear, transparent, gold-colored coating formed upon the surface of the bottles which was hard, but the bottles could be scratched, nevertheless, by firmly rubbing two containers against each other. A number of glass bottles treated by this process were spray coated with a mixture of 90% vinyl cyclohexene dioxide and 10% of Resin V. The temperature of the surfaces was about 450° F. After two minutes at this temperature, a hard solid transparent coating was formed. Rubbing two of the coated bottles hard against each other by hand resulted in no scratches.

Example X.—This example relates to application of the coating materials of the present invention to glass and also to any other type of solid surface such as metal (for example steel, aluminum alloys, brass, etc.); ceramics, such as pottery, insulators, etc.; plastics such as thermoset cross-linked resins (e.g., thermoset phenol-formaldehyde resins, melamines, etc.); wood, etc. The only limitation as to the solid surface is that it be compatible with the coating material, for example, that it be inert to the coating agent and that the solid surface be resistant for short periods of time to temperature to about 300° to 500° F. In the present example the preferred coating agent is chosen for illustration and is exemplified by the mixture of Example I but it will be understood that any coating agent disclosed herein and/or contemplated by the present invention may be used, for example, the allyl orthophthalates and the various coating agents and mixtures described hereinbelow.

The equipment used may be that of Ransburg Electrocoating Corporation of Indianapolis, Indiana and Chicago, Illinois. Other electrostatic spraying systems may be used. Such systems have in common an applicator to spray a liquid coating material, means for conferring on the particles of sprayed material an electric charge and a grounding means for supporting the article to be coated so as to maintain an opposite electrical charge on the surface to be coated. This technique is recognized as an efficient spraying technique because the electrostatic forces concentrate the sprayed material onto the surface to be sprayed and greatly reduces waste of coating material. That is to say in the electrostatic spraying technique there is not as much waste of the sprayed material as in ordinary spraying techniques and the inconvenience, fouling of the environment, etc. experienced in ordinary spray techniques are greatly mitigated by the electrostatic technique.

A particularly advantageous electrostatic spraying technique and apparatus therefor is that described in a paper by Emory, P. Miller and Lester L. Spiller entitled "Electrostatic Coating Process (Part I and Part II)" published in Paint and Varnish Production of June and July 1964. Such apparatus comprises a disc unit described in Part I and depicted in FIGS. 7 and 9 thereof and in the corresponding text, all such being incorporated herein by reference.

In this technique a rotating disc is provided which rotates rapidly enough to eject, by centrifugal force, a spray of liquid introduced at the center of the disc and to spray the ejected material onto the surface to be coated. The coating material is supplied to the center of the rotating disc, for example by forcing it under pressure up through an axial passage formed in the vertical saft supporting the disc (the disc being horizontal). An electric potential is applied to the disc to give it an electric charge (which is concentrated at the edge of the disc); the articles to be coated are carried by a continuous conveyor about the rotating disc through an angle of almost 360°; and the conveyor is provided with means to maintain an electric charge of opposite sign on the articles conveyed and to carry away the charges on the sprayed particles. Each article will also be caused to spin about its own vertical axis so as to expose its entire outer surface to the spray unless it is intended to coat only one surface, such as one side of a panel. Also relative vertical motion of each article and the disc will be produced, most conveniently by reciprocating the disc along its vertical axis so as to coat the entire height of each article. Bottom surfaces are coated by this procedure, for example, the bottoms of bottles and other glass containers. Where desired seals may be applied to the open tops of containers to prevent entry of liquid coating material into the interior of the containers although generally this is not necessary. The apparatus described will be suitably housed to confine sprayed material that misses the surfaces to be sprayed or that drips from such surfaces.

Heretofore, in employing this technique, it has been thought to be necessary to use a polar solvent to impart the necessary electrical characteristics to the coating material. We have found that this is not necessary with materials of the present invention, especially those that contain a metal salt such as any of the polyvalent metal salts of phenolic resins, or polyhydric phenols or polysiloxanols mentioned above, or any of the Lewis acids mentioned above such as stannous octoate and triphenyl tin chloride or conductive pigments and other conductive adjuvants. The coating mixtures of the present invention have the desired electrical characteristics and, where they do not have such characteristics or have them in insufficient degree, such characteristics may be imparted by incorporating soluble metal salts such as calcium, barium, sodium, aluminum, Fe III, Ti IV, Sn II and zinc salts of phenolic novolac resins such as Resin V, of polyhydric phenols and of the polysiloxanols mentioned above.

Employing rotating disc equipment of this character and employing the mixture of Example I, glass bottles have been coated as follows: The bottles were heated to and maintained at 400° F. and were suspended on a conveyor which circumscribed the rotating disc almost 360°. The disc had a diameter of 10" and was rotated at a speed of 1800 r.p.m. A D.C. voltage of 90 kilovolts at 3 milliamps was applied to the disc. The mixture of Example I was supplied to the center of the disc by forcing it up through an axial passage in the shaft supporting the disc. The bottles were spun about their vertical axes as they revolved around the disc and the disc was reciprocated vertically from the bottoms to the tops of the bottles. About 95% of the material sprayed was applied to the bottles as an effective coating and only about 5% was wasted. The coating on the bottles cured within 3 minutes and the coatings were in every respect sound, uniform, durable and resistant as coatings applied by the spray gun as in Example I.

ALLYL ORTHOPHTHALATES—GENERAL DESCRIPTION

Among other prepolymers which have been found useful as coating agents for glass is diallyl orthophthalate. This monomer was sprayed without a catalyst on hot (500° F.) glass surfaces and was found to provide a clear, hard coating. It was found that better results were obtained when the diallyl orthophthalate was prepolymerized from its initial viscosity of about 12½ centipoises at 25° C. to 1,000 centipoises at 25° C. It was further found that the coating was improved by using a catalyst such as a peroxide catalyst, for example, dicumyl peroxide. Coatings of diallyl o-phthalate were also improved by including vinyl stearate in the mixture, which functioned as a plasticizer and improved abrasion resistance and lubricity. In general, diallyl o-phthalate gave clear, hard coatings, but these were not as resistant to caustic, hot water, etc. as the cycloaliphatic polyepoxide coatings of the preceding examples. (The coatings applied by the preferred embodiment of the invention, e.g., those of Examples I to III, where characterized by exceptional resistance to caustic solution, hot water, steam and 50% ethanol.)

Other similar vinyl-type monomers and prepolymers that may be used in place of diallyl o-phthalate, or which may be used in admixture with diallyl o-phthalate and/or with one another are diallyl p-phthalate, divinyl o- and p-phthalates, diallyl hexahydro-o-phthalate, diallyl hexahydro-p-phthalate, divinyl hexahydro-o-phthalate, divinyl hexahydro-p-phthalate; substitution products of these phthalates and hydrogenated phthalates such as those having nuclear alkyl (methyl, ethyl, etc.) chloro, etc. substituents; also corresponding condensed ring systems derived from naphthalene and hydrogenated naphthalene; also pyridine analogues of the foregoing o- and p-phthalates; also allyl and vinyl esters of pyromellitic acid such as

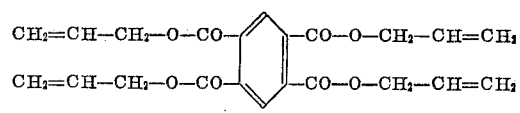

DIALLYL o-PHTHALATE MIXTURES—DETAILED DESCRIPTION

Diallyl o-phthalate coating mixtures were prepared as in Table V.

ide systems available as Ciba Hardener 950) and 17.5 grams of decylglycidyl ether was prepared. This mixture was sprayed at 400° F. on a glass bottle. The coating hardened to a clear glossy solid in less than five minutes.

TABLE V.—FORMULATION PARTS BY WEIGHT

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Ingredient: | | | | | | | | | | | | | | | | |
| Diallyl phthaltate | 100 | 100.0 | 246.0 | 270.0 | 270.6 | 246.0 | 10.00 | 10.00 | 10.00 | 10.00 | 10.00 | 10.00 | 100.00 | 90.00 | 82.0 | 82.0 |
| Vinyl stearate | | | 77.5 | 34.0 | 34.0 | 31.0 | 1.24 | 1.24 | 1.24 | 1.24 | 1.24 | 1.24 | | 11.3 | 10.3 | |
| Maleic anhydride | | | | | | 49.0 | | | | | | | | | 16.0 | 16.0 |
| Allyl glycidyl ether | | | | | | | 4.75 | 4.75 | 4.75 | | | | | | | |
| Pigment Green B | | 0.05 | | | | | 0.015 | | | 0.015 | | | 0.1 | 0.1 | 0.1 | 0.1 |
| Polymer Green 6GS | | | | | | | | 0.15 | | | 0.10 | | | | | |
| Rampo Green | | | | | | 9.0 | | | | | | | | | | |
| Dicumyl peroxide | | | | | | | 0.07 | 0.07 | | 0.05 | 0.05 | | 0.5 | 0.5 | 0.5 | 0.5 |
| Prepolymerized | No | No | Yes | Yes | Yes | Yes | Yes | Yes | Yes | Yes | Yes | Yes | Yes | Yes | Yes | Ye |
| Prepol. reaction temp. (° C.) | | | 164 | 164 | 164 | 164 | 164 | 164 | 164 | 164 | 164 | 164 | 135 | 135 | 135 | 135 |
| Cure time (min.) at 500° F | 5 | 5 | | 5 | >10 | 5 | 5 | 5 | 5 | 5 | 5 | 5 | 5 | 5 | 5 | 5 |

Gelation tests were carried out with results as set forth in Table VI.

The pot life of this mixture is rather short for application by ordinary spraying technique but it can be applied suc-

TABLE VI.—FORMULATION PARTS BY WEIGHT

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ingredient: | | | | | | | | | | | | | | | |
| Diallyl phthalate | | | 10 | 10 | 10 | 10 | 10 | 10 | 10 | 10 | 8.2 | 10 | 10 | 10 | 10 |
| Vinyl stearate | 10 | 10 | | | | | | | | 1.24 | 1.0 | 1.24 | | | |
| Maleic anhydride | | | | | | | | | | | 1.6 | | | | |
| Alkyl arylphosphite | .01 | .01 | | | | | | | | | | | | | |
| Polymon Green 6GS | | | .01 | .01 | | .01 | .30 | .30 | | | | | | | |
| Pigment Green B | .01 | .01 | | | | | | | | | .01 | | | | |
| Dicumyl peroxide | | .005 | | .005 | | .01 | .01 | .05 | | | .05 | .05 | .05 | .05 | .05 |
| Gel time (min.) at 165° C | >400 | >400 | 400 | 190 | 200 | 400 | 400 | 35 | >280 | >280 | 20 | 20 | 20 | 20 | 20 |

| Formulation | Amount (g.) | Pigment | Soluble | Gel time (min.) at 165° C. |
|---|---|---|---|---|
| Diallyl phthalate | 10.00 | Monolite Fast Yellow | No | 250 |
| | | Monolite Fast Red 4S-PDR | No | >250 |
| | | Polymon Blue LBS | No | >250 |
| | | Polymon Blue 3RS | No | >250 |
| | | Polymon Yellow RS | No | >250 |
| | | Polymon Violet RS | Yes | 160 |
| Pigment | 0.01 | Perox Blue 2R | Yes | 100 |
| | | Perox Yellow No. 9 | Yes | 100 |
| | | Perox Red No. 6 | Yes | 100 |
| | | Pigment Green B | Yes | >250 |
| | | Ramapo Green | No | >250 |
| | | Control | | 90 |

OTHER POLYMER SYSTEMS

In addition to cycloaliphatic polyepoxides and allyl phthalate (and related) systems other systems employing different types of monomers or prepolymers were found to be useful for purposes of the present invention. The systems found to be useful cured at 500° F. within a minute or two and when sprayed on glass at 450° F. they formed useful films. Results are set forth in Table VII below.

TABLE VII

| Monomer | Time for polymerization (sec.) | Nature of film |
|---|---|---|
| (1) Vinyl 2-chloroethyl ether | 120 | Very thin film. |
| (2) Trimethallyl isocyanurate | 30 | Opaque brown film, some decomposition. |
| (3) Allyl benzene | 60 | Tacky yellow film. |
| (4) Trimethoxyboroxole | 15 | Very thin film. |
| (5) Diallyl maleate | 15 | Yellow heavy film. |
| (6) Triallyl citrate | 60 | Tacky yellow film. |
| (7) Triallyl cyanurate | 60 | Clear film. |
| (8) N,N-diallyl melamine | 60 | Opaque film, some decomposition. |
| (9) Vinyl stearate | 15 | Clear film. |

In those cases (Nos. 1 and 4) where the resulting film was very thin, a thicker film can be produced by prepolymerizing the monomer to make it less volatile. Also prepolymerization, the use of catalysts and/or the use of a higher temperature or a longer time will produce a harder film in those cases (Nos. 2 and 6) where the film was tacky.

Further examples of other types of coatings systems are given in Examples XI, XII and XIII below.

Example XI.—A mixture of 50 grams of a resin obtained from p,p'-dihydroxydiphenylpropane and the diglycidyl ether of bisphenol A, 1.5 grams of a polyamine adduct (a commercially available catalyst for such epox- cessfully, as it is prepared, to a disc and applied by the disc to a hot glass surface by the electrostatic technique of Example X, in which various aliphatic and aromatic amine hardeners known to be useful for diglycidyl ether of bisphenol A are employed.

Example XII.—A mixture of 50 grams of diglycidyl ether of bisphenol A, 20 grams of decylglycidyl ether and 1.5 grams of the monoethylamine adduct of boron trifluoride was sprayed on a glass bottle at 400° F. The coating hardened to a clear glossy solid in 20 minutes. This curing period is rather long but the system has a long pot life (more than three days) and can be used readily with conventional spray equipment.

Example XIII.—A mixture was prepared of 96 grams of a polyethertriol (Union Carbide's LHT 240) having an equivalent weight of 240, toluene diisocyanate in the amount of 39.4 grams and 0.014 gram of ferric acetylacetonate. This mixture was sprayed onto a glass bottle at 400° F. It hardened to a clear glossy coating in less than 5 minutes. The mixture has a short pot life but is adapted to the electrostatic spray technique of Example X.

Another embodiment of the invention is the coloring of glass fibers and of fabrics woven from glass fibers.

In the production of colored glass fabrics, the glass is extruded from a die in the form of fibers which are later woven into a fabric. Glass fibers so produced are fragile and they lose strength and become more brittle very rapidly. To protect such fibers, to inhibit their loss of strength and increase in brittleness and to lubricate them, a protective coating is applied by spraying or dipping immediately after the fiber is extruded. In practice, the fiber is coated as it comes from the die within a few inches of the die orifice. After the coated fibers are woven into fabric, it is necessary to remove the coating, as with a solvent, and then apply a dye.

In accordance with the present invention, the glass fibers are coated, preferably as they come from the die in accordance with previous practice, but with one of the coating agents of the invention. For example, the coating mixture of Example I, or any of the other coating mixtures herein described but preferably those that are quick curing, and most preferably those which are based on cycloaliphatic polyepoxides, is employed, and in the coating mixture is incorporated a suitable dye or pigment. The glass fibers as they are extruded from the dies, and while still hot (e.g., at a temperature of 400° to 500° F.) are sprayed with, for example, the mixture of Example I, or they are passed through a body of such mixture. The coating so applied may be further cured by passing the coated fibers through an oven or tunnel heated to 300° to 500° F., the residence time in the oven or tunnel being sufficient to cure the coating. The coating thus applied serves the multiple purposes of protecting the fibers from moisture, cushioning mechanical shocks, lubricating the fibers and providing the desired color. The steps of removing the lubricant coating and subsequent step of applying a dye, as in the conventional process, are avoided.

GENERAL OBSERVATIONS

From the description and data above it will be apparent that a wide variety of solventless polymerizable monomeric and lower polymeric systems may be used to coat glass. Requirements are that the system have a low enough viscosity to permit its application, preferably by spraying, as a uniform, thin coating; that the applied coating cure quickly at temperatures of about 300° to 500° F.; that the cured coating be hard enough, tough enough and tenacious enough to serve the intended purpose; and that the system contain little if any solvent, diluent or the like which requires evaporation and does not react with the system to avoid the necessity of evaporation. In addition to these requirements—which are met by a large variety of systems including such diverse monomeric materials as cycloaliphatic polyepoxides, allyl-o-phthalate, the diglycidyl ether of bisphenol A, various allyl and vinyl monomers and polyurethane systems—there are certain desiderata. Among such desiderata, which are satisfied by the preferred cycloaliphatic polyepoxides, are the following: Cure to a hard coating at 300°-500° F. in a very few minutes or less than one minute; production of an adherent coating which is resistant to caustic, hot water, steam and solvents such as 50% ethanol; production of a clear, colorless coating which is, therefore, adapted to preserved transparency where that is desired and which can take on the color of an added dye or pigment; compatibility with a large number of adjuvants such as dyes, pigments, ultraviolet absorbers, etc. A further desideratum is a pot life of hours or days such that a complete system ready for application can be made up in quantity in advance and need not be used immediately. A still further desideratum is that the system be electrically conductive such that it is compatible with the electrostatic spraying technique of Example X.

It will be understood that not all of the desiderata need be satisfied for the system to be useful and to be satisfactory for certain types of service. It will also be understood that where a system does not fully satisfy a requirement or a desideratum it is often possible to modify it to meet or satisfy the objective. Thus, an undesirably high viscosity may be improved by adding a low viscosity reactive diluent such as vinylcyclohexene dioxide; too slow a cure may be remedied by employing a higher temperature or a more active catalyst or by prepolymerizing. Too fast a cure may be remedied by employing a lower temperature and/or a less active catalyst, or by using an electrostatic spraying system as described in Example X and mixing the monomer system and catalyst continuously just before application to the spinning disc.

If the monomer is too volatile, volatility may be reduced by prepolymerization, or by using a more active catalyst and a lower temperature. Brittleness of the film on glass may be remedied by using a plasticizer such as vinyl stearate or by use of a catalyst which permits a lower temperature, hence inhibits oxidation. Where difficulties are the result of oxidation, as for example, embrittlement, the application and curing may be carried out in an inert atmosphere, e.g., carbon dioxide or nitrogen.

In connection with preferred cycloaliphatic polyepoxide systems, the acidic (Lewis acid) catalyzed systems are advantageous for the reason, among others, that, unlike amine catalyzed systems, the coatings are colorless and will, therefore, assume the color of any added dye or pigment. Stannous salts such as stannous octoate also provide colorless coatings.

Among other uses and advantages of the invention are tinting window and windshield glass and the application of a protective coating (clear or colored) to conductive strips applied to glass for de-icing and defogging. Also, as stated above, the ceramic products may be coated to preserve strength and, if desired, to color the ceramic.

It will, therefore, be apparent that now and useful techniques and products are provided for coating various articles.

We claim:
1. A method of applying to glass or ceramic articles a film of coating material comprising
    (a) providing a coating material in the form of a liquid monomer or prepolymer which is thermosetting and which will cure, when applied as a film to a solid surface heated to a temperature of about 300 to 500° F., within a few minutes to form a solid film, said coating material being substantially free of solvent and volatile non-reactive diluent,
    (b) providing said articles with at least the surfaces thereof to be coated preheated to a temperature such that a film of containing material sprayed onto such surfaces undergoes at least a partial cure by absorption of heat from said surfaces during spray application to a non-sagging state, and
    (c) applying said liquid coating material to the surfaces to be coated by spraying it onto such surface to form a film thereon having a thickness on the order of 0.001 inch.

2. The method of claim 1 wherein the material coated is glass.

3. The method of claim 2 wherein the coating agent is applied in the presence of a catalyst.

4. The method of claim 3 wherein the catalyst is dissolved or dispersed in the coating agent.

5. The method of claim 3 wherein the catalyst is applied to the surface of the glass before spraying the coating agent on the glass.

6. The method of claim 4 wherein a coloring agent is incorporated in the coating agent.

7. The method of claim 4 wherein an ultraviolet light absorber is incorporated in the coating agent.

8. The method of claim 4 wherein the glass is in the form of glass containers.

9. The method of claim 4 wherein the glass has a temperature of about 300° to 500° F. during the application of the coating agent and the coating agent is selected to cure at such temperature in a period not exceeding about 5 minutes.

10. In the process of manufacturing glass containers wherein the containers are formed from a molten mixture which is formed into containers and the containers are passed through a lehr to anneal them, the improvement which comprises spraying the containers while still in heated condition and before they have lost any substantial amount of their initial strength with a coating agent comprising a monomer or low molecular weight polymer, such monomer or low molecular weight polymer being capable of rapid cure at the temperature of the glass containers, the resulting cured polymer forming a hard, adherent coating on the glass, such coating agent being substantially free of solvent and volatile non-reactive diluent, being in liquid condition and being applied to the containers as a film having a thickness on the order of 0.001 inch, said glass containers being at a temperature such that the applied film of coating agent undergoes at least a partial cure by absorption of heat from the glass during spray application to a non-sagging state.

11. The method of claim 10 wherein a catalyst is dissolved or dispersed in the coating agent.

12. The method of claim 10 wherein a catalyst is applied to the surface of the glass containers before spraying the coating agent on the glass containers.

13. The method of claim 11 wherein a coloring agent is incorporated in the coating agent.

14. The method of claim 11 wherein an ultraviolet light absorber is incorporated in the coating agent.

15. The method of claim 14 wherein the glass containers have a temperature of about 300° to 500° F. during application of the coating agent and the coating agent is selected to cure at such temperature in a period not exceeding about 5 minutes.

References Cited

UNITED STATES PATENTS

| | | | |
|---|---|---|---|
| 3,284,262 | 11/1966 | Dowling | 117—161 K X |
| 3,323,889 | 6/1967 | Carl et al. | 117—94 X |
| 3,399,075 | 8/1968 | Spiller | 117—93.4 |
| 3,471,317 | 10/1969 | Clock | 117—94 |
| 3,475,149 | 10/1969 | Eckerle et al. | 65—3 |
| 3,503,779 | 3/1970 | Young et al. | 117—33.3 |
| 2,694,655 | 11/1954 | Pullman et al. | 117—126 GR |
| 2,824,851 | 2/1958 | Hall | 117—126 GR |
| 2,939,761 | 6/1960 | Stein | 117—126 G R X |
| 3,248,253 | 4/1966 | Barford et al. | 117—17 |
| 3,306,954 | 2/1967 | Moore | 117—126 GR |
| 3,338,863 | 8/1967 | Haag | 117—21 X |
| 3,379,559 | 4/1968 | Gerhardt | 117—94 X |
| 3,127,456 | 3/1964 | Wahl | 117—93.4 R X |
| 3,323,934 | 6/1967 | Point | 117—93.4 R X |

RALPH S. KENDALL, Primary Examiner

U.S. Cl. X.R.

117—93.4 NC, 104 R, 94, 124 E, 126 GR; 65—60